(12) United States Patent
Kavipurapu

(10) Patent No.: US 6,901,070 B2
(45) Date of Patent: May 31, 2005

(54) DYNAMICALLY PROGRAMMABLE INTEGRATED SWITCHING DEVICE USING AN ASYMMETRIC 5T1C CELL

(76) Inventor: Gautam Nag Kavipurapu, 7750 N. MacArthus, Irving, TX (US) 75063

( * ) Notice: Subject to any disclaimer, the term of this patent is extended or adjusted under 35 U.S.C. 154(b) by 827 days.

(21) Appl. No.: 09/729,531

(22) Filed: Dec. 4, 2000

(65) Prior Publication Data

US 2002/0067200 A1 Jun. 6, 2002

(51) Int. Cl.[7] .............................................. H04L 12/50
(52) U.S. Cl. ........................ 370/369; 370/380; 370/386; 370/395.7
(58) Field of Search ................................ 370/369, 370, 370/371, 380, 381, 382, 383, 386, 395.1, 395.7, 395.71, 412

(56) References Cited

U.S. PATENT DOCUMENTS

| | | | | |
|---|---|---|---|---|
| 4,237,463 A | * | 12/1980 | Bjor et al. .................. | 370/284 |
| 5,210,744 A | * | 5/1993 | Yamanaka et al. .......... | 370/413 |
| 5,365,519 A | * | 11/1994 | Kozaki et al. .............. | 370/378 |
| 5,410,540 A | * | 4/1995 | Aiki et al. .................. | 370/390 |
| 5,555,243 A | * | 9/1996 | Kakuma et al. ............ | 370/352 |
| 5,806,084 A | * | 9/1998 | Lin et al. .................... | 711/110 |
| 6,212,181 B1 | * | 4/2001 | Divivier et al. ............. | 370/379 |
| 6,721,324 B1 | * | 4/2004 | Shinohara ................ | 370/395.1 |

* cited by examiner

Primary Examiner—Ricky Ngo
Assistant Examiner—Christine Ng
(74) Attorney, Agent, or Firm—Thompson & Knight LLP; James J. Murphy

(57) ABSTRACT

A switching element including first, second and third ports each comprising a plurality of lines is disclosed. A first memory cell includes a storage element, a first pass gate for selectively coupling a first line of the first port to the storage element, a second pass gate for selectively coupling a first line of the second port to the storage element, and a third pass gate for selectively coupling a first line of the third port to the storage element. A second memory cell includes a storage element, a first gate for selectively coupling a second line of the first port to the storage element, a second pass gate for selectively coupling a second line of the second port to the storage element, and a third pass gate for selectively coupling a second line of the third port to the storage element.

12 Claims, 7 Drawing Sheets

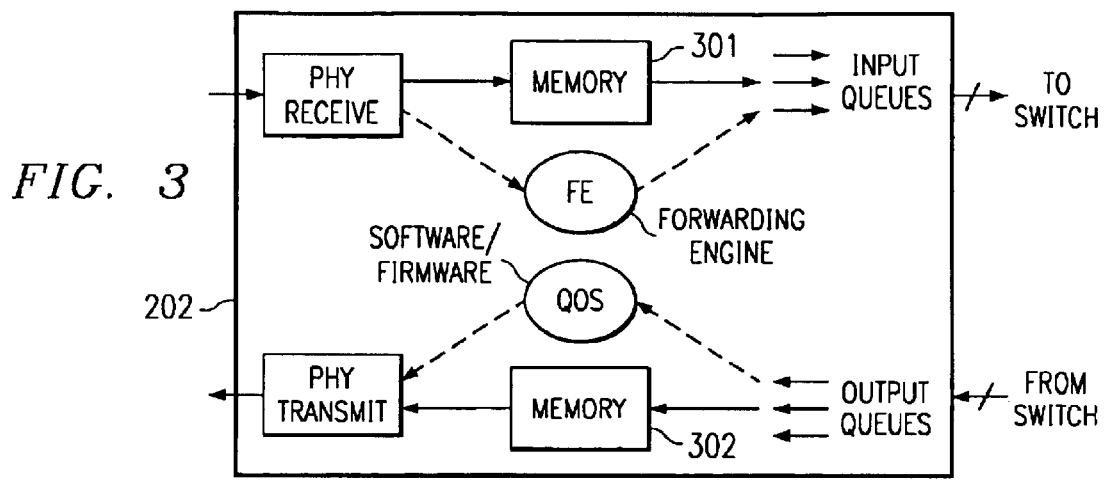
FIG. 3
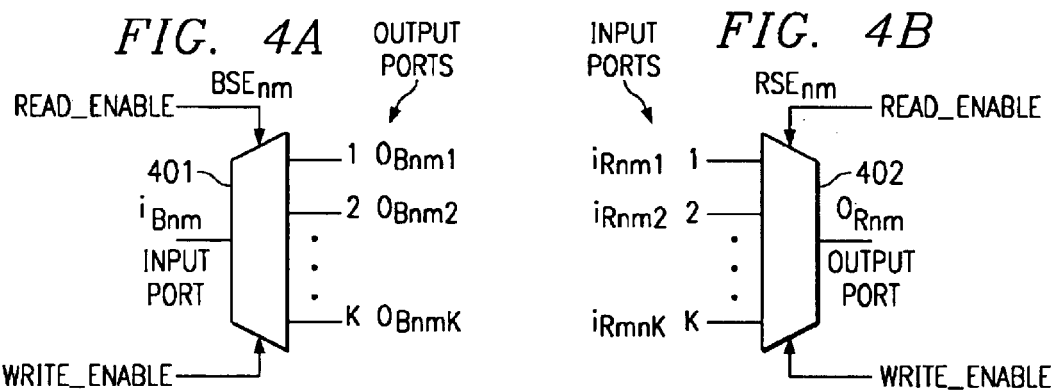
FIG. 4A
FIG. 4B
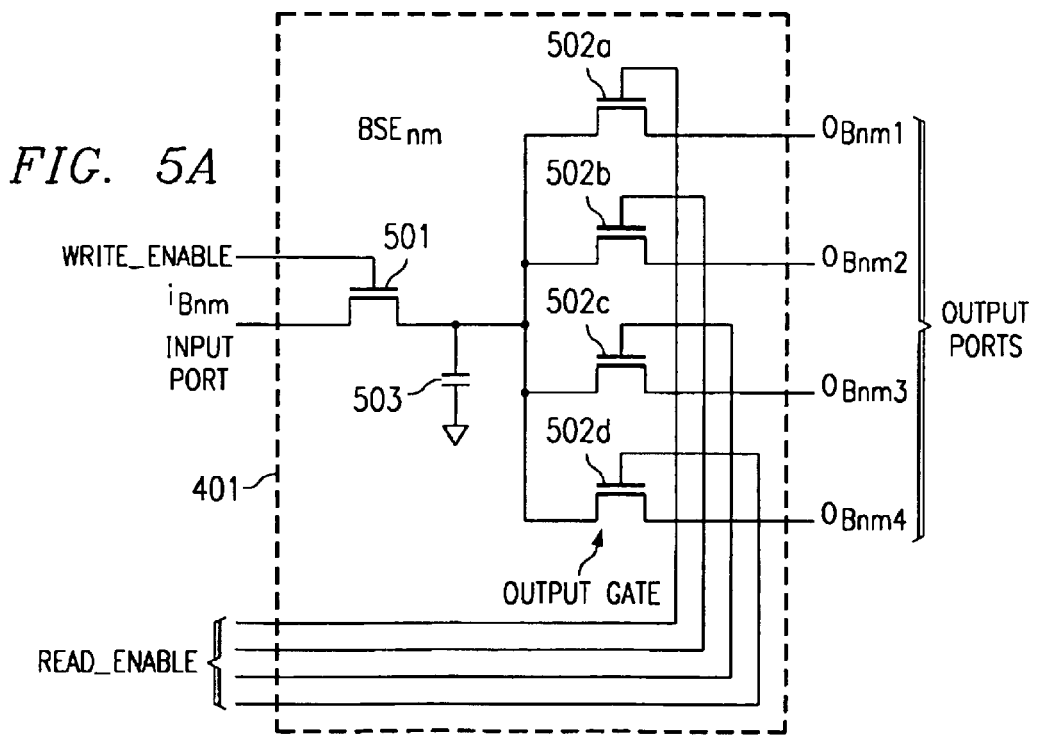
FIG. 5A

DYNAMICALLY PROGRAMMABLE INTEGRATED SWITCHING DEVICE USING AN ASYMMETRIC 5T1C CELL

FIELD OF INVENTION

The present invention relates in general to electronic switching devices and elements and in particular to dynamically programmable integrated switching devices suitable for use in high speed routing and switching applications.

BACKGROUND OF INVENTION

In networked systems, the interconnect or the core switch fabric connecting the various system element, essentially attempts to connect N inputs to M outputs for the maximum number of possible routes. The "Non-Blocking" nature of the interconnection or the availability of "Clear Channels" enables the switch fabric to route or switch individual data packets.

In one interconnection architecture, the core switch fabric is based on time-domain multiple access (TDMA) to a common backplane or a shared bus. A controller, together with software, acts as the bus master and implements the routing kernel. The routing kernel is usually implemented in an algorithm such as a Hierarchical Weighted Fair Queuing algorithm.

Alternatively, the core switch fabric may be based on single or multiple crossbar integrated circuits. In this case, the controller asserts appropriate read and write commands to the crossbar and controls the exchange of data with a set of input and output buffers, typically constructed from common memory elements such as DRAM and SRAM. Switches are then built by using multiple cards which connect to the multiple input and output ports of the crossbar with a non-blocking switch fabric.

In any event, the devices interfacing with the switch fabric are reaching higher and higher speeds. This in turn requires higher throughput rate through the switch fabric itself. Existing systems calculate aggregate throughput, in bits per second, by taking the throughput in bits per second for one port of the switch fabric and multiplying it by the total number of input and output ports. This aggregate capacity can be increased by varying the number of input and output ports on the switch fabric, the speed of operation of the switch fabric and the efficiency of the network processor. Notwithstanding, device physics and the electrical characteristics of busses and interconnects are still significant limiting factors on throughput speed.

Consequently, a switch element is required, which taken individually or in conjunction with other elements of a similar type, enables the design and fabrication of high speed scalable switch fabrics.

SUMMARY OF INVENTION

According to one embodiment of the principles of the present invention, a switching element is disclosed which includes first, second and third ports each comprising a plurality of lines. A first memory cell includes a storage element, a first pass gate for selectively coupling a first line of the first port to the storage element, a second pass gate for selectively coupling a first line of the second port to the storage element, and a third pass gate for selectively coupling a first line of the third port to the storage element. The switching element also includes a second memory cell having a first pass gate for selectively coupling a second line of the first port to the storage element, a second pass gate for selectively coupling a second line of the second port to the storage element, and a third pass gate for selectively coupling a second line of the third port to the storage element.

Switching elements, switches and switching subsystems embodying the principles of the present invention enable the design and fabrication of high speed scalable switch fabrics. Such high-speed switch fabrics are particularly useful in network switches and routers, although not necessarily limited thereto.

BRIEF DESCRIPTION OF DRAWINGS

FIG. 3 is the general architectural block diagram of a typical Input Output Interface;

FIG. 4A is the general logical block diagram of a Broadcast Switch Element (BSE);

FIG. 4B is the general logical block diagram of a Receive Switch Element (RSE);

FIG. 5A is the circuitry diagram of a Broadcast Switch Element implemented using a 5T1C cell;

DESCRIPTION OF THE PREFERRED EMBODIMENT

Figure 1A:
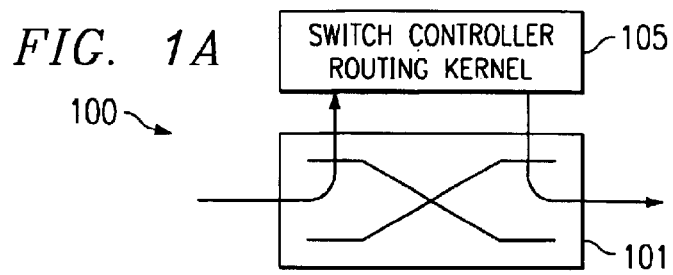
FIG. 1A is conceptual block diagram of a router or a switch.
Figure 1B:
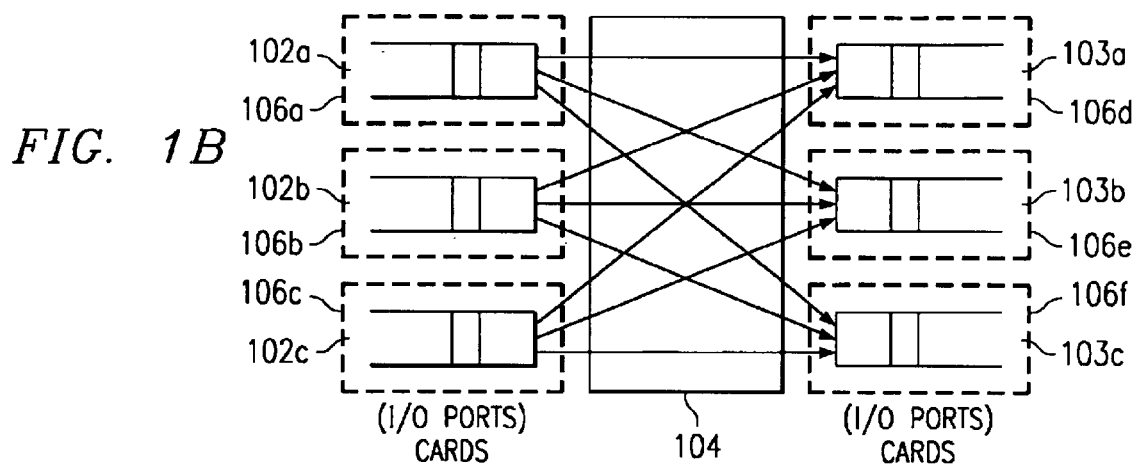
FIG. 1B is the logical block diagram of a switch router with input and output queues.

A conceptual diagram of a switch /routing system architecture 100 is shown in FIGS. 1A and 1B. Switch fabric 101 in conjunction with the I/O of switch /router 100 can be visualized as a number of input and output queues 102, 103 by non-blocking interconnections 104. Interconnections 104 may be for example single or multiple stage crossbars or a backplane. The input and output queues 102, 103 are typically disposed on the I/O port cards 106a,f. System controller 105 implements a queuing/de-queuing algorithm (kernel), and generally controls the core switch fabric under software and firmware control.

Figure 2A:
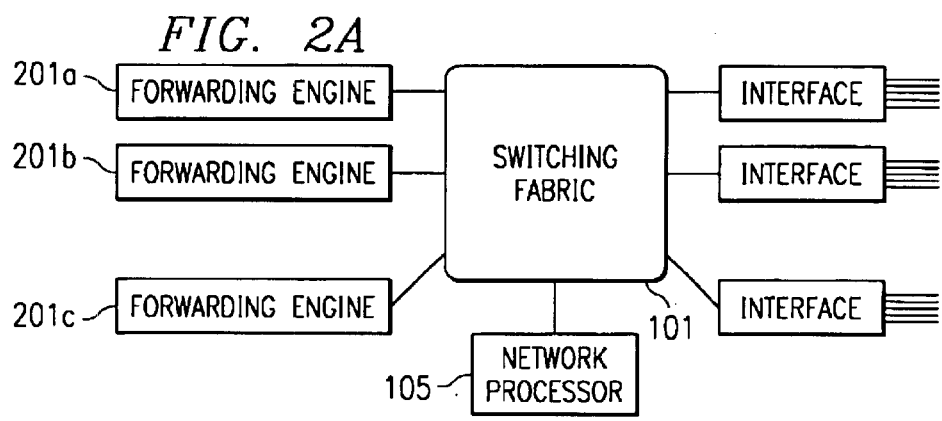
FIG. 2A is the functional block diagram of a router designed with forwarding engines.
Figure 2B:
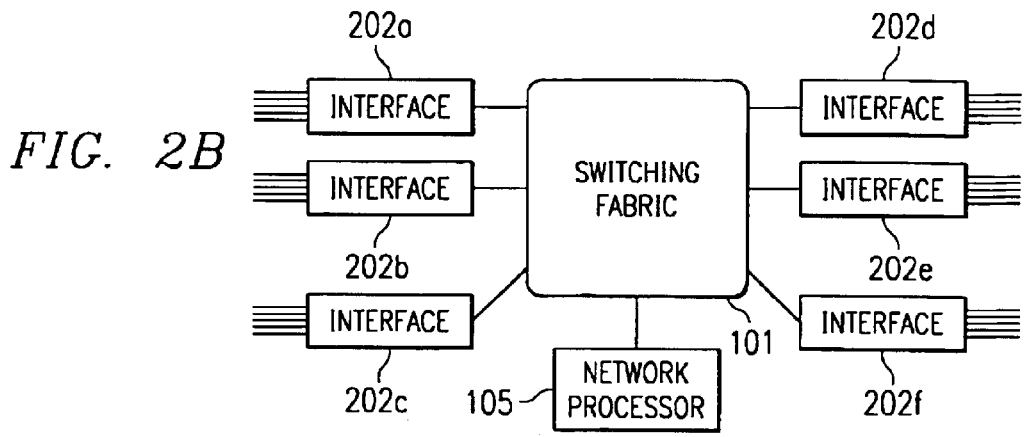
FIG. 2B is the functional block diagram of a router designed with Interfaces and a core switch fabric.

Exemplary router architectures based on the current generation of network processors are shown in FIG. 2A and FIG. 2B. In the system of FIG. 2A, the processing power is in the hardware and software of forwarding engines 201. With respect to the system of FIG. 2B, the processing power is in the systems interfaces 202, including the scheduling and system control functions. Specifically, the main difference between the architectures shown in FIGS. 2A and 2B is where the actual forwarding table resides (in FIG. 2A in the forwarding engines and in FIG. 2B in the system interfaces). These route tables can be represented by data structures generated by the network processor and are stored in the system memory.

With respect to FIG. 3, a selected I/O interface 202 is modeled by the general structure shown. The forwarding engine is a firmware implementation of the algorithms. Memory buffers 301, 302 logically act as the input/output queues in the system. These memory buffers add delays to the whole process of taking a packet from the physical input port of the router (PHY Receive) to the physical output port (PHY Transmit) with the appropriate header/routing information.

FIG. 4A depicts a Broadcast Switch Element, (BSMnm—taken from the nth row and mth column of the switch architecture discussed below). 401, logically represented by a 1×K de-multiplexer having one input port (iBnm) and K output ports (0Bnmk A Receive Switch Element (RSE) 402 is logically represented by a K×1 multiplexer in FIG. 4B and has K input (iRnmk) ports and one output port (0Rnm).

According to the principles of the present invention, a 1×4 BSE 401 is implemented by a 5T1C (5 transistor, 1 capacitor) dynamic memory cell shown in FIG. 5. The input port (gate) 501, labeled iBnm, and output ports 502$a,d$, labeled 0Bnm1 to 0Bnm4 are formed by metal oxide semiconductor field effect transistors (MOSFETs). Specifically, the first output port is formed by the output transistor 502$a$, the second output port is formed by the transistor 502$b$, the third output port is formed by the transistor 502$c$ and the final and fourth output port is formed by the transistor 502$d$. Each 5T1C cell has a single storage element represented by the capacitor 503.

Figure 5B:
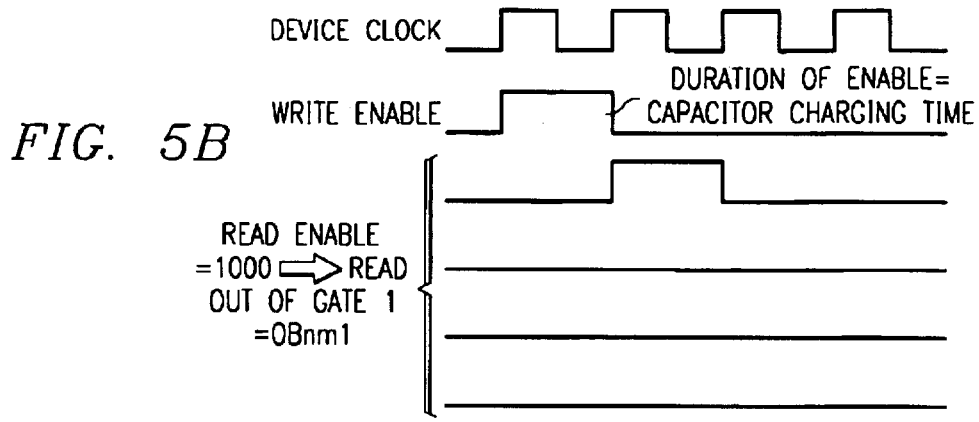
FIG. 5B is the timing diagram of a read-write cycle for a BSE.

Exemplary read and write cycles for BSE 401 element are shown in FIG. 5B, where the appropriate gates are turned-on as indicated by the assertion of the read and write enables. In the write cycle, the input gate 501 is turned-on with the signal WRITE ENABLE WE and the storage capacitor 503 is allowed to charge to a level proportionate to the input gate transistor drive. The voltage across the storage capacitor is a function of the current and the charging time is dictated by the time constant.

Data written into the storage capacitor can be read out by selectively turning on the output transistors 502$a,d$ either individually, all at once, or in some other combination, by selecting the corresponding READ ENABLE signal RE1–RE4. In particular, if the port block, described below, to which the specific BSE belongs, is being employed for a multicast session then all the output gates can be turned on simultaneously. Otherwise the gates are normally turned on individually. To read from the storage element simultaneously with a write, a feedback mechanism external to the basic switch element retains the data and writes them back into the storage capacitor 503 in an off cycle.

Figure 6A:
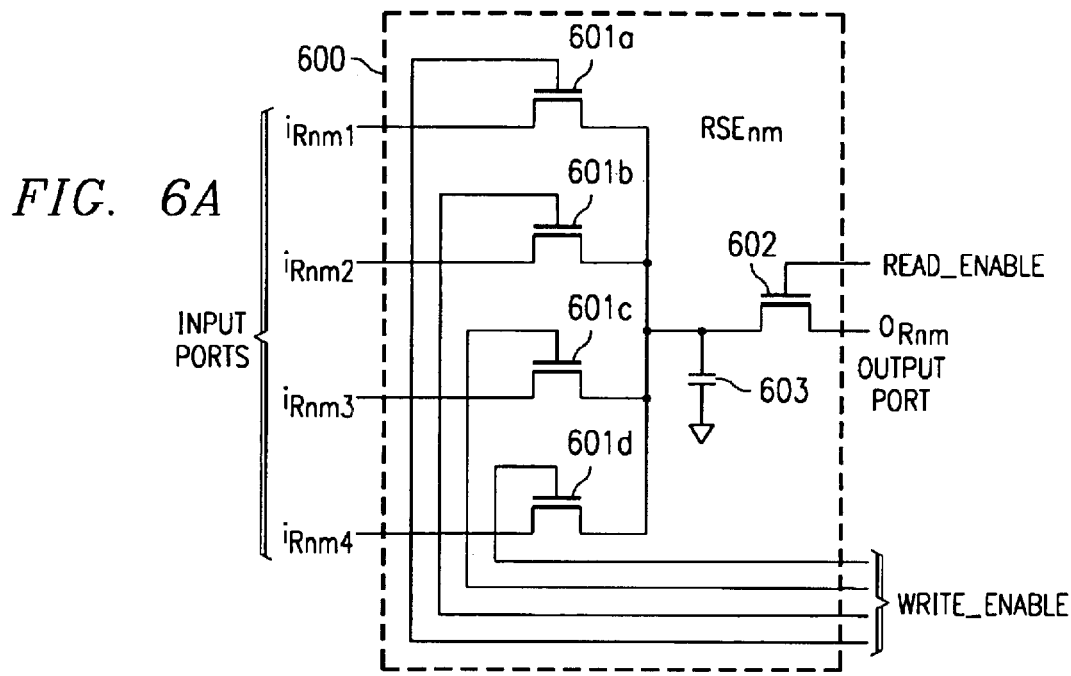
FIG. 6A is the circuitry diagram of a Receive Switch Element implemented using a 5T1C cell.

The inventive concepts can also be also be applied to RSE core 402 as shown in FIG. 6A. Here, the RSE core is implemented with gate transistors 601$a,d$ forming the input ports and the gate transistor 602 forming the output port. The storage element is again represented by a capacitor, in this case capacitor 603. It should be understood that at a given time during the operation of the RSE only one input port 601 may be used to write data into the storage element represented by the storage capacitor 603.

Figure 6B:
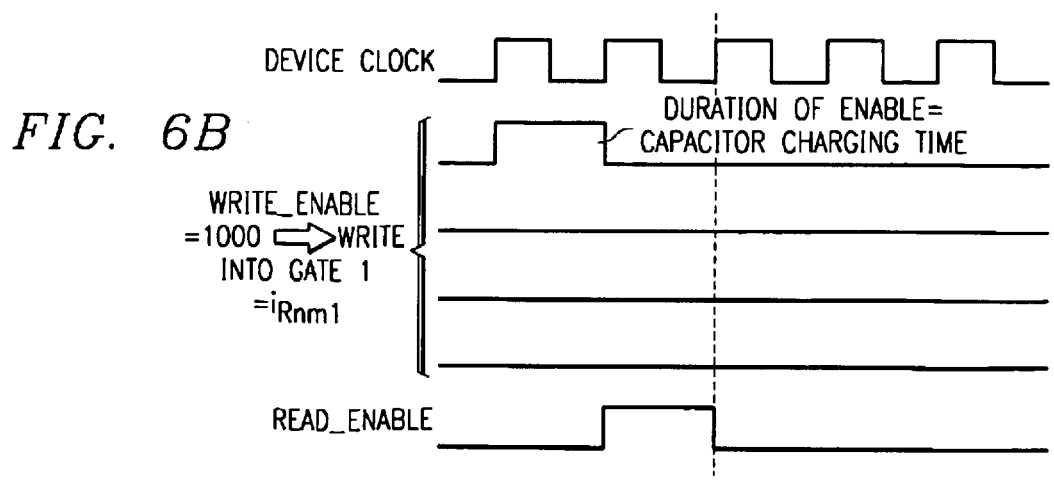
FIG. 6B is the timing diagram of a read write cycle for a RSE.

In case of an RSE, the operation is the reverse of the operation of the BSE, as shown in FIG. 6B. In the first cycle, data can be written into storage capacitor 603, by the use of any one of the input port gates 601$a,d$ and the WRITE ENABLE signals WE1–WE4. When multi-valued storage systems are possible using a single storage element, all four gates can be used concurrently to store multiple values into the storage capacitor 602. Data can be read from the output port gate 602 simultaneous with a write, if an external feedback mechanism is provided external to the core RSE switch element.

Figure 7:
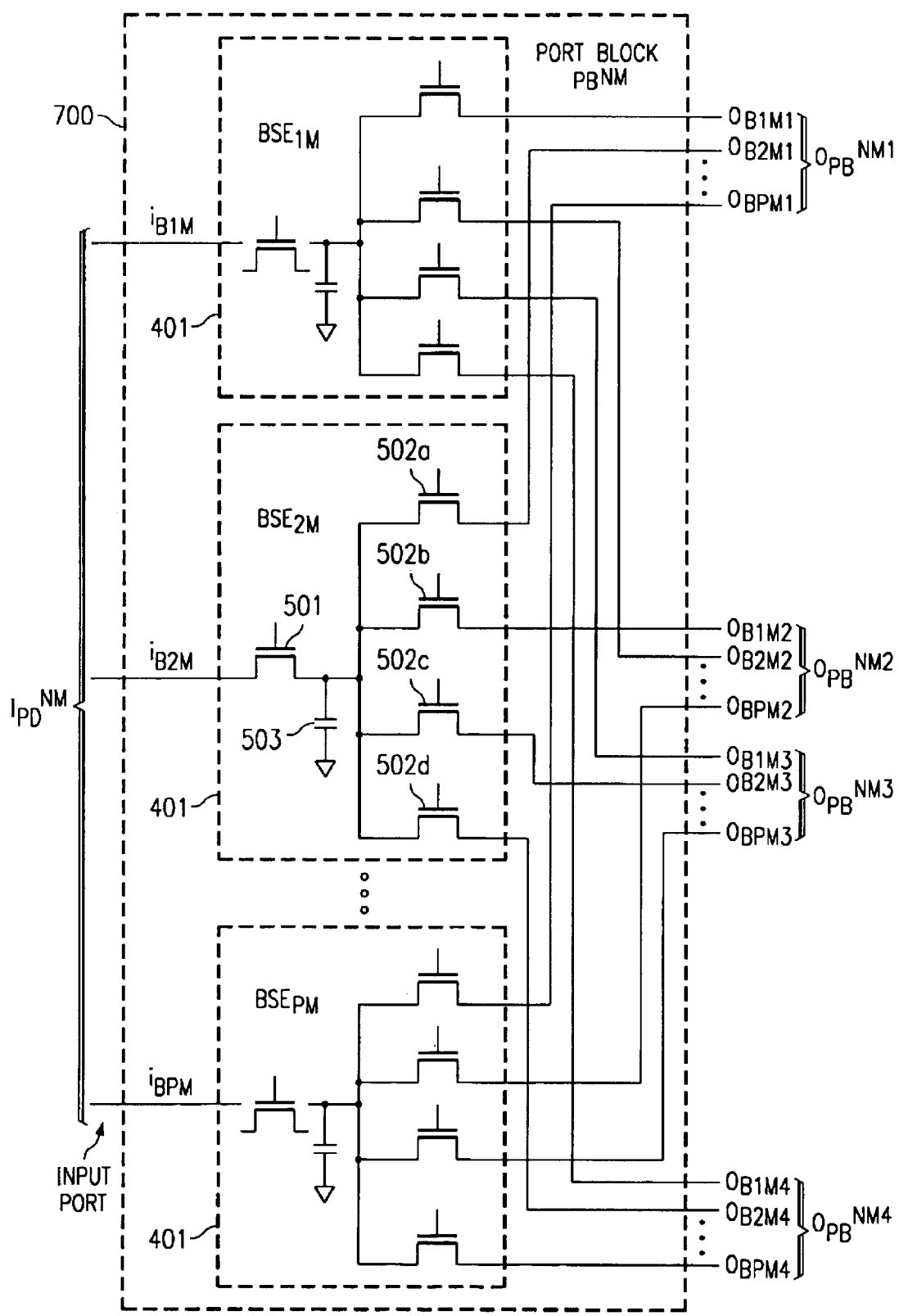
FIG. 7 is the circuitry diagram of a port block formed by a 5T1C BSE.
Figure 8:
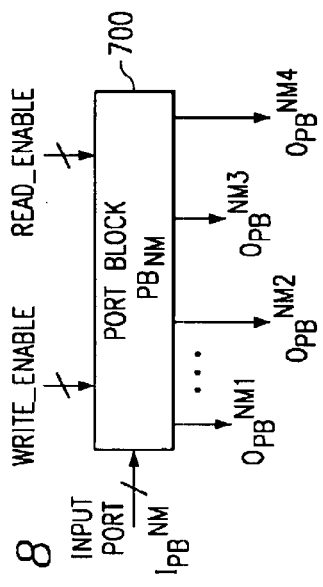
FIG. 8 is the functional block diagram of a port block formed by 5T1C BSE.

With respect to FIG. 7, a port block 700 that is P bits wide is created using P number of 5T1C BSEs 500. All the input ports of the P number BSEs 500 are taken together to form the input port $I_{PB}{}^{NM}$ of the port block 700 with each input controlled by a corrresponding write enable signal WE1–WE4. Controlled by a corresponding write enable signal WE1–WE4. The illustrated port block has 4 output ports $O_{PB}{}^{NM1}$ –$O_{PB}{}^{NM4}$. The first output line of the first output of each BSE 500 are tied together to form the output port 1 $O_{PB}{}^{NM1}$. In a similar fashion, output port 2 $O_{PB}{}^{NM2}$ of the port block is formed by taking all the second output ports of each of the BSE 500 together, and so on such that, each of the output ports are formed in a linear fashion. Other nonlinear combination of BSE can be used to form a port block. FIG. 8 shows the interface diagram of the port block.

Figure 9:
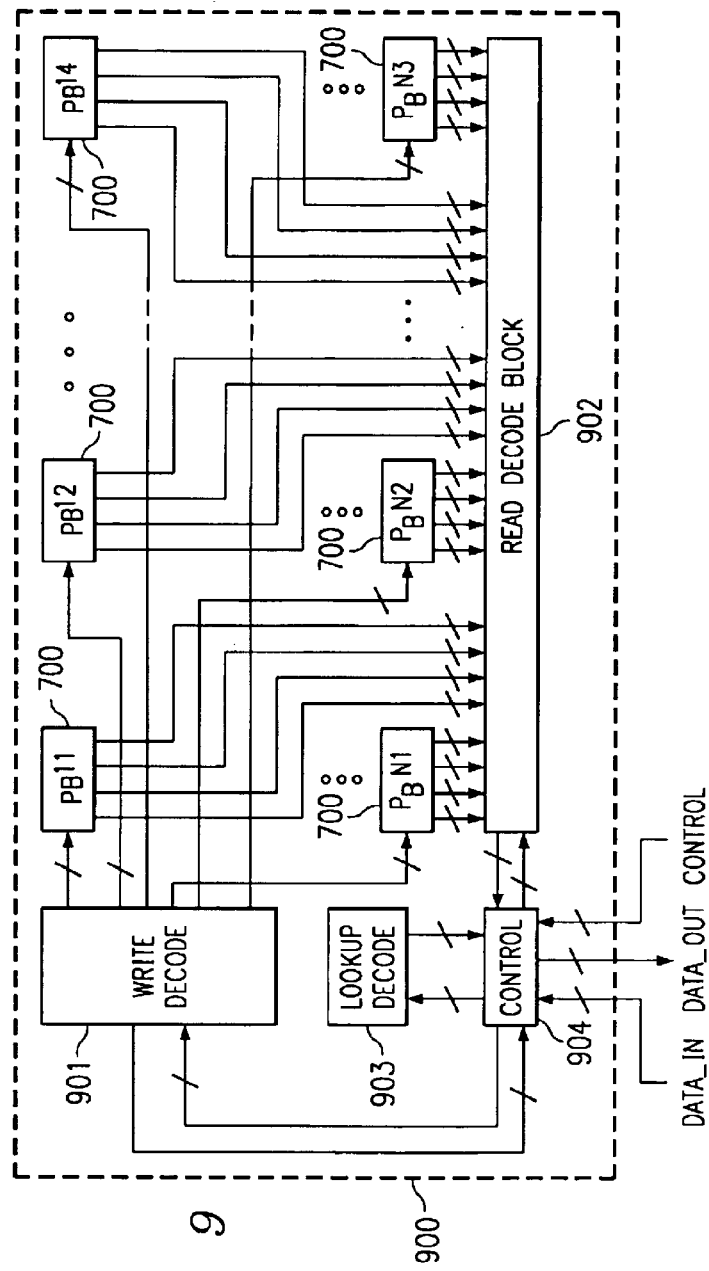
FIG. 9 is the architecture of a switching device formed with by port blocks implemented with 5T1C.

A switch matrix of size N×M, within the DIPS device (900), is formed by port blocks 700 arranged in rows and columns as shown in FIG. 9. (It is not necessary that the individual port blocks are arranged in a row column fashion and interconnected in a matrix format.) In addition to the matrix of port blocks 700, DIPs device 900 also includes Write Decode and Read Decode blocks 901, 902, Lookup Decode 903 and controls 904.

Figure 10:
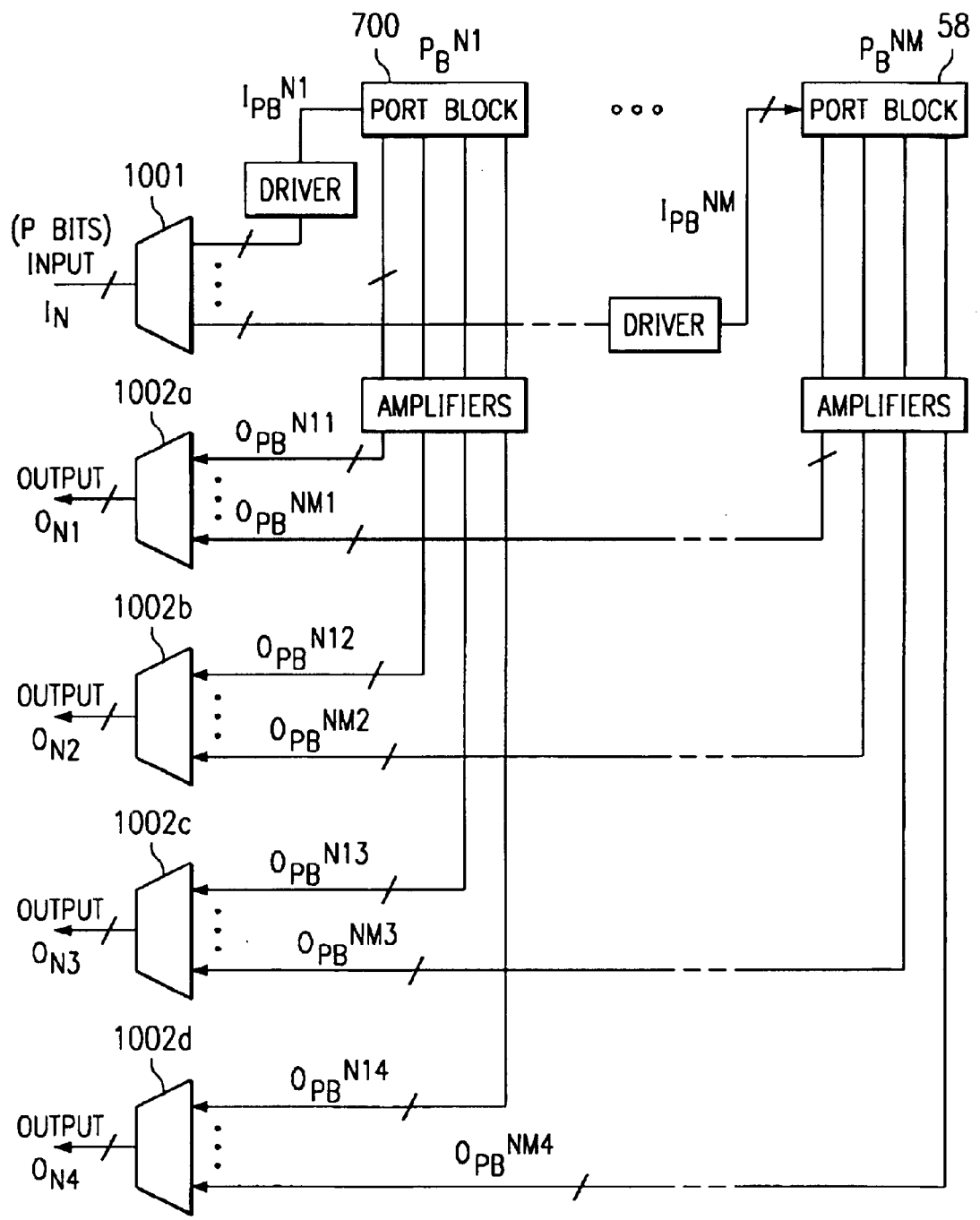
FIG. 10 Is the block diagram of a row within a switching device emphasizing the column decode.

With respect to FIG. 10, each row N of port blocks has one P-bit wide input $I_N$, this input feeds into a 1 to M input demux (1001). This de-mux is a form of decode and essentially is part of the write decode block 901. Demux 1001 is preferably of a conventional design, using combinational circuits such as cascaded, domino etc. Based on the decode code given to the decode circuit, the input data on the input port $I_N$ is sent to the appropriate port block in the row. For each row N in the DIPS device there is one input de-mux 1001, that allows one input to be tied to each of the inputs of the M port blocks in a row.

When each port block comprises 4 5TIC memory cells, each row of port blocks 700 has four outputs $O_{N1}$–$O_{N4}$ that are each P bits wide, each coupled through an output mux (1002). Each output mux (1002) is a M to 1 mux. Preferably, each of the P-bit wide outputs of the port blocks are tied to the output muxes 1002 as follows; the first output $O_{PB}{}^{NM1}$ of each of the M port blocks 700 in the row, first output mux 1002$a$, the second output $O_{PB}{}^{NM2}$ of each port 700 blocks is an input to the second output mux 1002$b$ and so on for all the four outputs.

Output muxes 1002 are part of read decode block 902 in the DIPS device 900. Each of output muxes are formed by combinatorial circuits and implement a 1 of M decode. The outputs of each of these muxes are sent to an I/O block that is part of the controller (904) for the DIPS device. DIPS device 900 has a single output through the output port of the device which is P bits wide. DIPS device 900 also includes a single input port that is also P bits wide. These constraints are placed on the DIPS device due to semiconductor packaging limitations.

Figure 11A:
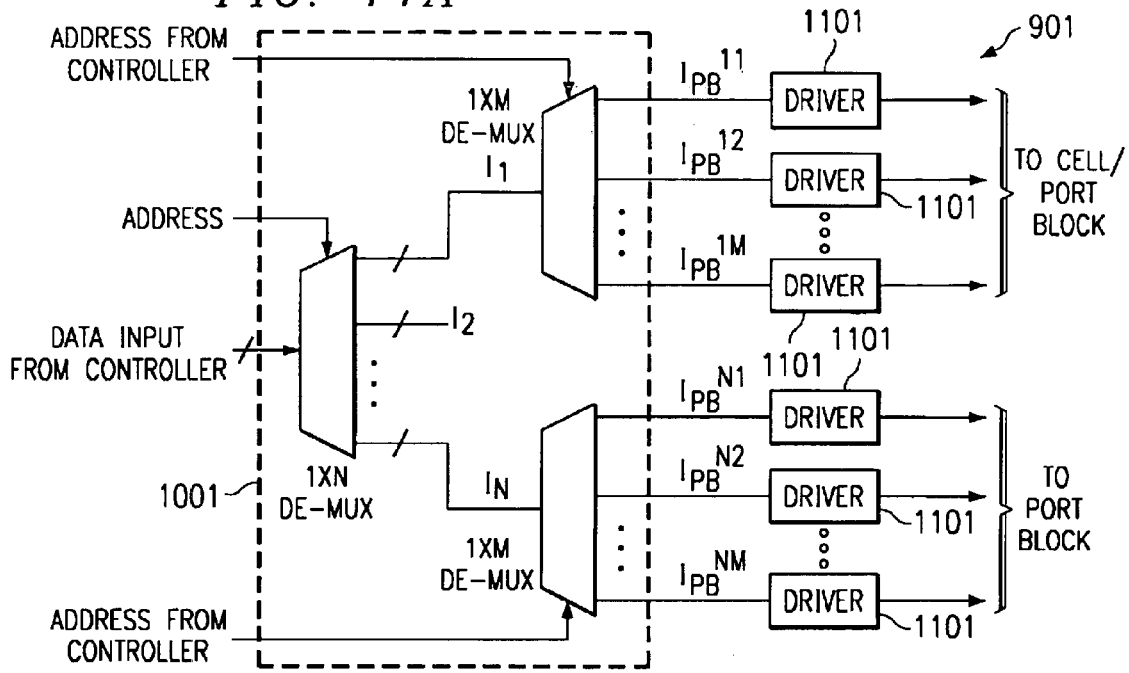
FIG. 11A is the functional block diagrams of the write decode block of FIG. 9.
Figure 11B:
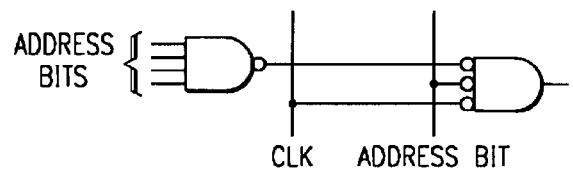
FIG. 11B is a possible implementation of a decode from prior art.
Figure 12:
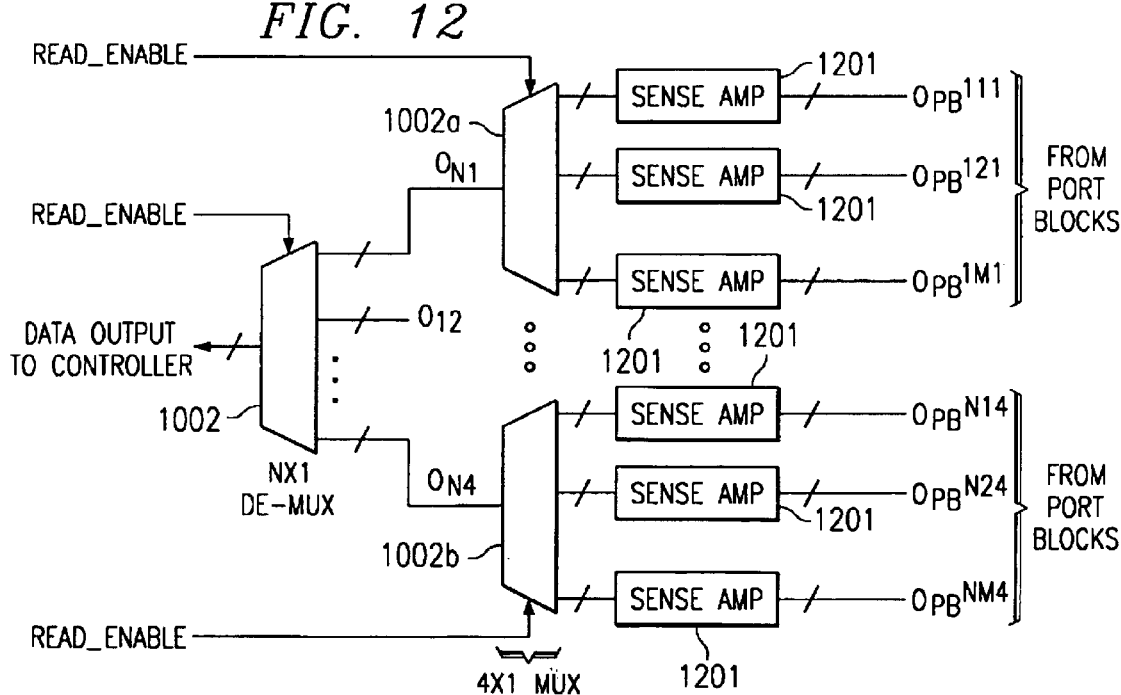
FIG. 12 is the functional block diagram of a read decode block.

FIGS. 11A and 11B are more detailed diagrams of Write Decode block 901. The output of input mux 1001 is sent to a write drive block (1101) that ties into the input gate of each BSE. FIG. 12 is a more detailed diagram of Read Decode block 902. Each of the output gates of the BSE tie into an amplification block (1201), that is formed by a differential amplifier as shown. The outputs of the differential amplifier drive the inputs to the combinatorial output mux 1002. Within the port block, a reference cell can be used to drive the differential inputs to the amplifier 1201 or a shadow, 5T1C cell that is used for redundancy can be used, to drive the reference input to the differential amplifier.

If the shadow 5T1C cell is used then each of the port blocks forms a mirrored memory element and switch. The use of the mirrored memory element and switching device can be used to control errors in reading or writing. This implements a pseudo cache.

With respect to FIG. 12, the write decode block is implemented to form a 1 to M decode for each port block. A control input that is $Log_2$ (NM) bits wide is decoded into the appropriate port block address within the row. A simple decode scheme is shown in this embodiment. It should be clear to those of ordinary skill in the art, decode can be changed without departing from the spirit of the invention.

The operation of DIPS 900 device can be summarized as follows:

1) An external Switch Controller asserts the appropriate read and write signals to the DIPS device that is part of the Switch fabric matrix.

2) The reads and write signals are decoded for the assertion of the reads and writes to the port blocks internally within the DIPS (900) device by the controll (904).

3) The reads and writes are decoded by the read-decode blocks and the write-decode blocks within the DIPS device.

4) The write and reads are done asynchronously and in the same clock cycle, thus in a given clock cycle at the minimum, using a simple linear decode one can access two port blocks.

The throughput thus of a DIPS device based on the aforementioned protocol followed by the read and write cycles, is 2 * Pbits * Speed in Mhz of the DIPS device. Thus for a 100 Mhz DIPS device with a port block that is 64 bits wide the throughput of a DIPS device is=2 * 64 * 100 Mhz=12.8 Gbps for a DIPS device. For a fabric implemented by using multiple DIPS devices throughput is # DIPS device * 12.8 Gbps per DIPS device.

A similar implementation of the DIPS device can be done using the RSE. While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. A switch comprising:
   a plurality of port blocks organized as an array of N number of rows and M number of columns each comprising:
      a plurality of I/O ports each including K number of P-bit wide output ports; and
   a plurality of memory cells each including a first pass gate for coupling a selected line of a first port block with a storage element and a second pass gate for coupling a selected line of a second port block with said storage element;

read decoder circuitry for selecting one of said plurality of I/O ports of a first selected one of said plurality of port blocks and reading data from a selected memory cell of a second selected one of said plurality of port blocks, said read decoder comprising:
      for each of said N number of rows, M number of K ×1 multiplexers each for selecting one of K number of P-bit wide output ports from each of said port blocks of said M number of columns; and
      an N ×1 multiplexer for selecting one of N number of output ports selected by said M number of K ×1 multiplexers; and write decoder circuitry for selecting one of said plurality of I/O ports of a second selected one of said plurality of port blocks and writing data into a selected memory cell of said second selected port block.

2. The switch of claim 1 wherein said plurality of port blocks are organized as an array of N number of rows and M number of columns, each of said port blocks having K number of P-bit wise input ports, and said write decoder comprises:
   for each of N number of rows, a 1×M demultiplexer for selecting an input port from a selected one of said port blocks of said M number of columns; and
   a 1×N demultiplexer for selecting between inputs from each of said 1×M demultiplexers.

3. The switch of claim 1 wherein said memory cells comprise dynamic random access memory cells.

4. The switch of claim 1 wherein each of said plurality of memory cells of each said port block is coupled to a plurality of output I/O ports and an input I/O port.

5. The switch of claim 1 wherein each of said plurality of memory cells of each said port block is coupled to a plurality of input I/O ports and an output port.

6. A switch comprising:
   a plurality of port blocks organized in an array of N rows and M columns, each said port block comprising:
   a first P-line wide port;
   a plurality of K number of P-line wide second ports; and
   a plurality of P number of memory cells each having a first pass gate for selectively coupling said cell to a corresponding one of said lines of said P-line wide first port and a plurality of K number of second pass gates each for selectively coupling said cell to a corresponding line of said P-line wide second ports;
   first decoder circuitry comprising:
   for each of said N number of rows, M number of K ×1 multiplexers each for selecting one of said K number of P-bit wide second ports from each of said port, blocks of said M number of columns; and
   an N ×1 multiplexer for selecting one of N number of ports selected by said M number of K ×1 multiplexers; and
   second decoder circuitry comprising:
   for each of said N number of rows, a 1×M demultiplexer for selecting one of said first ports of said port blocks of said M number of columns; and
   a 1×N demultiplexer for selecting one of N number of first ports selected by said 1×M demultiplexer.

7. The switch of claim 6 wherein said first port of said port blocks comprises an input port and said second decoder comprises a read decoder.

8. The switch of claim 6 wherein said plurality of second ports of said port locks comprise output ports and said first decoder comprises a write decoder.

9. The switch of claim 6 wherein said first port of a selected one of said port blocks comprises an output port and said plurality of second ports of said selected one of said port blocks comprise output ports.

10. The switch of claim 6 wherein said first and second pass gates of a selected one of said memory cells of a selected one of said port blocks selectively couple said first and second ports to a storage capacitor.

11. The switch of claim 6 wherein:

the first pass gates of a first selected one of said memory cells of a selected port block couples said first selected memory cell to a first line of a first one of said second ports and a second one of said plurality of pass gates couples said first selected memory cell with a first line of a second one of said second ports; and the first pass gates of a second selected one of said memory cells of said selected port block couples said second selected memory cell with a second line of said first one of said second ports and a second one of said pass gates of said second selected memory couples said second selected memory cells with a second line of said second one of said second ports.

12. The switch of claim 6 wherein said pass gates of said memory cells comprise transistors.

* * * * *